United States Patent [19]

Haque et al.

[11] Patent Number: 4,620,822

[45] Date of Patent: Nov. 4, 1986

[54] FLAT BOTTOM HOLE DRILL

[75] Inventors: Sazzadul Haque, Troy, Mich.; Terry A. Schroeder, Ft. Wayne, Ind.

[73] Assignee: General Electric Company, Detroit, Mich.

[21] Appl. No.: 736,638

[22] Filed: May 21, 1985

Related U.S. Application Data

[63] Continuation-in-part of Ser. No. 359,051, Mar. 17, 1982, abandoned.

[51] Int. Cl.⁴ .............................................. B23B 51/00
[52] U.S. Cl. .................................... 408/224; 408/223; 408/230
[58] Field of Search ............... 408/211, 223, 224, 225, 408/226, 227, 228, 230, 231, 229, 199, 59, 713, 715, 186

[56] References Cited

U.S. PATENT DOCUMENTS

| | | | |
|---|---|---|---|
| 1,069,930 | 8/1913 | Down | 408/223 |
| 2,237,901 | 4/1941 | Chun | 408/223 |
| 2,260,288 | 10/1941 | Black | 408/228 |
| 2,555,746 | 6/1951 | Horsky et al. | 408/59 |
| 3,014,386 | 12/1961 | Kallio | 408/211 |
| 3,578,762 | 5/1971 | Siebol | 408/224 |
| 3,963,365 | 6/1976 | Shallenberger | 408/186 |
| 4,149,821 | 4/1979 | Faber | 408/199 |
| 4,194,862 | 3/1980 | Zweekly | 408/224 |
| 4,248,555 | 2/1981 | Satou | 408/225 |

FOREIGN PATENT DOCUMENTS

| | | | |
|---|---|---|---|
| 751130 | 1/1967 | Canada | 408/211 |
| 0089123 | 9/1983 | European Pat. Off. | 408/224 |
| 286214 | 7/1915 | Fed. Rep. of Germany | 408/229 |
| 1177904 | 5/1965 | Fed. Rep. of Germany | 408/230 |
| 6610118 | 3/1973 | Fed. Rep. of Germany | 408/230 |
| 7411288 | 9/1974 | Fed. Rep. of Germany | 408/229 |
| 1120842 | 4/1956 | France | 408/59 |
| 116795 | 9/1979 | Japan | 408/223 |
| 961449 | 6/1964 | United Kingdom | 408/230 |
| 173093 | 12/1965 | U.S.S.R. | 408/211 |

Primary Examiner—William R. Briggs
Attorney, Agent, or Firm—Hedman, Gibson, Costigan & Hoare

[57] ABSTRACT

A drill is provided having opposed primary and secondary cutting edges extending perpendicular to the longitudinal axis of the drill. The primary cutting edge extends across the longitudinal axis of the drill to a terminus intermediate the longitudinal axis and the periphery of the drill. The secondary cutting edge extends inwardly from the periphery of the drill to a point intermediate the periphery and the longitudinal axis of the drill. The primary and secondary cutting edges are spaced from one another along the longitudinal axis so that the primary cutting edge leads the secondary cutting edge during a drilling operation. The primary cutting edge drills the inner part of the hole and the secondary cutting edge drills the outer part of the hole. The primary and secondary cutting edges are designed to generate substantially balanced forces about the longitudinal axis of the drill. Flutes extend from each cutting edge for efficient and reliable removal of chips.

10 Claims, 13 Drawing Figures

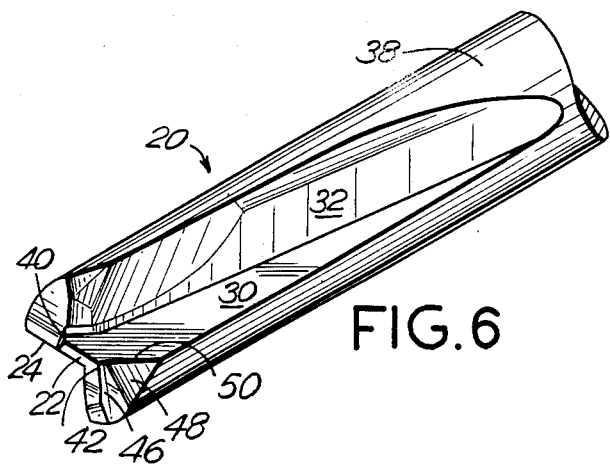
FIG. 6
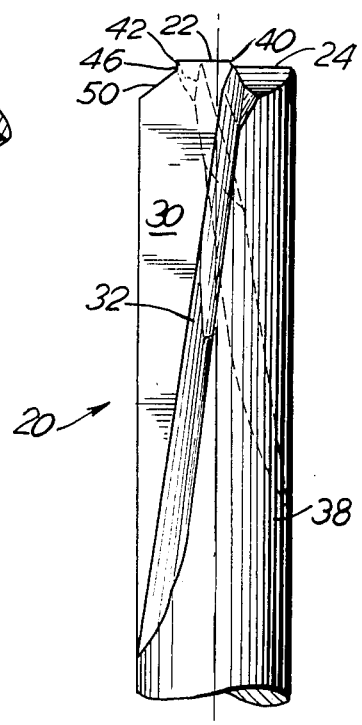
FIG. 8
FIG. 7
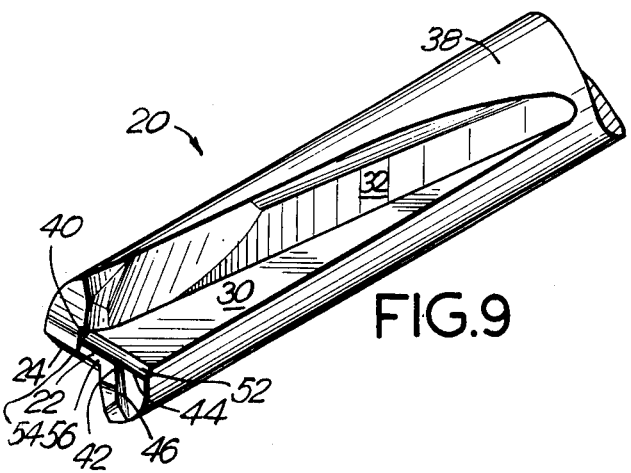
FIG. 9
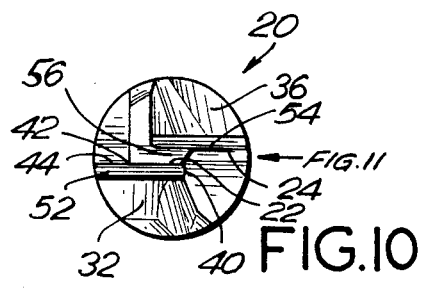
FIG. 10
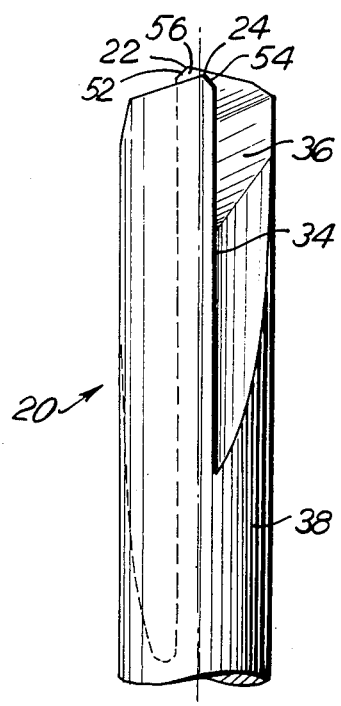
FIG. 11

FLAT BOTTOM HOLE DRILL

CROSS-REFERENCE TO RELATED APPLICATION

This application is a continuation-in-part of application Ser. No. 359,051, filed Mar. 17, 1982, now abandoned the disclosure of which is incorporated herein by reference.

BACKGROUND OF THE INVENTION

Drills frequently are used to provide cylindrical holes in metallic workpieces. As is well known, the cutting or boring action of the drill is carried out by an elongated substantially cylindrical member. One end of the drill member is securely mounted in the driving apparatus of the drill assembly which rotates the cutting member about its longitudinal axis. The opposed end of the elongated cutting member includes at least one cutting edge. A flute extends away from the cutting edge and provides a channel for removal of chips of stock that are produced as the hole is drilled.

A twist drill is one type of elongated cutting member commonly used on both wood and metallic stock. Briefly, the twist drill provides a plurality of cutting edges disposed symetrically about the perimeter of the drill and extending generally along the longitudinal axis thereof. A flute extends from each cutting edge and tyupically extends helically around the perimeter of the cutting member, hence the term twist drill. Although the cutting edges of the twist drill extend toward the longitudinal axis, they terminate a distance away from the axis.

The structural features of the twist drill have both operational advantages and disadvantages. A principle advantage is that the cutting forces are evenly distributed across the drill. Thus, in many materials, the twist drill will provide a precise hole, with each cutting edge contributing an equal amount to the cutting effort. More specifically, each cutting edge will generate chips or helical strips of stock material having a width equal to the radius of the drill, and a thickness that is a function of the feed rate of the drill into the stock divided by the number of cutting edges. A principal disadvantage of the twist drill is that the portion of the drill between the longitudinal axis and the innermost point of the cutting edges performs no cutting function. Consequently, the innermost portion of the material to be drilled is urged into the area of the cutting edges by an axial force exerted on the drill itself. In effect, the drill must be pushed into the material being drilled so that the material in the centermost portion of that hole can be urged into the path of the cutting edges.

The axial force required can be reduced by minimizing the distance between the longitudinal axis and the innermost point of each cutting edge. Of course, this distance cannot be reduced to zero because the material immediately surrounding the longitudinal axis provides the principal axial support for the twist drill. The amount of axial force can be reduced somewhat further by chamfering the central portion to encourage the movement of the stock material into the area of the cutting edges. Although these structural features minimize the axial force required to advance the twist drill, the axial forces are significant enough to make the twist drill inefficient and ineffective for stocks made of hard metallic substances, such as titanium. The exertion of these axial forces not only leads to an inefficient use of energy in a drilling operation, but also contributes to excessive wear on the twist drill itself. Thus, twist drills must be replaced frequently, thereby resulting in a substantial amount of down time for the entire drilling assembly.

A conventional "gundrill" is structurally distinct from the twist drill and, in some respects, is more desirable for drilling holes in hard metals. Briefly, the gundrill includes only one cutting edge and one flute. The single cutting edge extends from a point on the periphery of the gundrill through the longitudinal axis and to a point intermediate the opposite peripheral surface of the gundrill and the central axis thereof. The cutting edge terminates at an apex that is offset from the longitudinal axis of the gundrill so that the cutting end of the gundrill resembles an asymmetrical cone. The gundrill also includes a flute extending generally in an axial direction from the cutting edge to allow for removal of chips of stock that are cut by the gundrill. In operation, the portion of the gundrill extending from the longitudinal axis to the periphery accomplishes all of the cutting. Additionally, because the cut extends the full length of the radius, stock material does not have to be forced toward the cutting edge, and the axial force required is less than that required when using a twist drill. Due to this center cutting feature, the gundrill is more readily adapted to drilling holes in hard metals and has been widely employed in certain metal cutting applications such as drilling a hole in a gun barrel.

Although the single cutting edge and single flute structure of the gundrill provide an efficient center cut, it also results in an imbalance of forces during a drilling operation. This imbalance is particularly critical during the early phases on a drilling operation when the gundrill initially penetrates the stock. More particularly, because the gundrill has only one cutting edge, there is no symmetrical cutting surface to balance the forces exerted by the stock against the single cutting edge. The imbalance of forces with the gundrill frequently causes the gundrill to wobble which, in turn, causes a "runout" phenomena. Thus, the walls of the hole bored by the gundrill are not parallel to one another, but rather, bulge outwardly, particularly near the entry point to the hole.

To offset the inherent runout effects of a gundrill, gundrills are generally fabricated with wear pads which are adapted to bear against the sidewall surface of the drilled hole, and thereby function to guide the gundrill after its initial entry. Also, to minimize runout at the entry point of the hole, bushings frequently are employed to properly guide the gundrill into the desired location. The bushings are located on the surface of the stock and surrounding the area to be drilled. Thus, the wear pads bear against the bush and improve the alignment of the hole initial entry of the gundrill into the stock. Nevertheless, despite the use of wear pads and bushings, the imbalance of forces inherent in the gundrill design frequently causes misalignments that exceed the tolerances of many workpiece specifications. This is particularly likely to happen in workpieces made of very hard metallic substances. To attain the proper tolerances in these workpieces, a second reaming operation is often required. However, this reaming operation, like the use of bushings, is extremely time-consuming, inefficient, and costly.

In certain drilling operations, it is necessary to drill very precise holes for a short distance into a very hard material. Additionally, it often is desirable to provide a hole with a bottom that is substantially planar or flat and which is generally perpendicular to the side walls of the hole. More specifically, some design tolerances require the actual diameter of the hole to be in the range of −0.0005 inches to +0.0015 inches of the specified diameter. Also, in many specifications, the bottom surface of the hole may be non-planar provided the bottom surface includes a shoulder or ledge adjacent to and perpendicular to the side walls of the hole and extending a distance inwardly therefrom approximately equal to one half the radius of the hole. This non-planar bottom surface of the hole is acceptable only if the distance between the central portion and the peripheral shoulder portion of the hole bottom is very small.

Holes with the above cited specifications are required, for example, on the cutting head portion of an oil well drilling apparatus. In this type of apparatus, a head constructed from a very hard meterial, such as hard steel AISI 4340, has a plurality of precise shallow holes drilled therein to accept bits that will cut through rock during an oil drilling operation. Twist drills are currently used by certain tool manufacturers to make these holes. However, because of the extremely hard stock material, the twist drills have a very short life, and it often is necessary to use a reamer before achieving the desired precision hole. This, of course, is extremely expensive. It is also known to utilize gundrills for these purposes. However, as mentioned above, the gundrill is least precise during its initial penetration of the workpiece. Consequently, it is extremely difficult to obtain a precisely drilled shallow hole with a gundrill. Therefore, to achieve these design specifications with a gundrill, it is necessary to utilize a complex arrangement of bushings and also to subsequently ream the hole after the drilling operation.

Accordingly, it is an object of the subject invention to provide a drill that can precisely bore holes in a variety of materials.

It is another object of the subject invention to provide a drill that is particularly useful for drilling precise shallow holes in extremely hard material.

It is a further object of the subject invention to provide a drill that can drill a hole having a substantially flat bottom that is substantially perpendicular to the side walls of the hole, or a hole in which the bottom includes a peripheral shoulder that is substantially perpendicular to the side walls of the hole.

It is an additional object of the subject invention to provide a drill that operates so as to balance the cutting forces during a drilling operation.

It is yet another object of the subject invention to provide a drill that will reliably remove chips of stock material from the drilled hole.

It is an additional object of the subject invention to provide a drill that can drill precise holes without the use of bushings or the like.

It is still another object of the subject invention to provide a drill that can precisely drill holes without requiring a subsequent reaming operation.

It is a further object of the subject invention to provide a drill capable of drilling through hard metallic materials and which has a long life in operation.

SUMMARY OF THE INVENTION

The subject invention is directed to a flat bottom drill that is structurally distinct from both the twist drill and the gundrill. Although the subject drill can be used to drill any size hole in any material, the advantages of this invention over prior art drills are particularly apparent in drilling shallow holes (e.g., less than one inch) in extremely hard material such as titanium or very hard alloy steels (e.g., 35 to 40 Rockwell).

Structurally, the subject flat bottom drill includes opposed primary and secondary cutting edges extending from which are primary and secondary flutes. The primary cutting edge extends across the longitudinal axis of the drill from a point near the axis to a point on the opposite side of the axis, approximately midway to the periphery. The primary cutting edge is perpendicular to the longitudinal axis of the drill, and defines one axial end of the drill. The outermost portion of the radius on which the primary cutting edge is disposed is offset in the longitudinal direction of the drill witn respect to the primary cutting edge so that it performs no cutting function, as explained in greater detail below. The primary flute defines a substantially pie-shaped wedge removed from the body of the drill. This pie-shaped flute decreases in radial depth as the flute extends axially away from the primary cutting edge in order to increase the strength of the web supporting the cutting edges.

The secondary cutting edge of the subject flat bottom drill is also perpendicular to the longitudinal axis of the drill but is located on the side of the drill opposite the primary cutting edge. Additionally, the secondary cutting edge extends from the periphery of the drill at least to a point approximately midway between the periphery and the longitudinal axis. The secondary cutting edge is axially separated from the primary cutting edge so that it follows the primary cutting edge into the hole. As discussed below, the separation along the longitudinal axis of the drill between the primary and secondary cutting edges is a function of the feed rate of the drill.

In operation, the primary cutting edge cuts an annular central section of the resulting hole extending from the axis of the resulting hole to a point approximately midway between the longitudinal axis and the periphery of the hole. The secondary cutting edge follows the primary cutting edge into the hole and cuts a section extending from the periphery of the resulting hole to a point approximately midway between the periphery and the center. Thus, the primary cutting edge cuts the center part of the hole and the secondary cutting edge cuts the outer radial part of the hole. The relative lengths of the primary and secondary cutting edges can be varied according to the material being drilled, but are selected to provide substantially equal and opposite forces on the opposed cutting sides of the drill. Therefore, the subject flat bottom drill of the subject invention provides balanced forces that are not attainable by a conventional gundrill. Furthermore, as mentioned above, the primary cutting edge of the subject drill extends across the longitudinal axis thereof. Consequently, unlike the twist drill, the subject flat bottom drill provides a center cutting action. This feature of balanced forces, combined with a center cutting action, enables the subject drill to drill an extremely precise hole into a hard metallic stock.

The subject flat bottom drill differs significantly from the twist and gundrills in that the combination of primary and secondary, or inner and outer, cutting edges ensures that the maximum chip width will be equal only to approximately a quarter of the diameter of the drilled hole. In both of the prior art drills described above, the chip width generally equals the radius of the drill. The wider chips provided by the prior art drills have a tendency to jam in the flutes, thereby imbalancing the forces on the drill and contributing to the runout phenomenon described above. In the subject drill, by reducing the size of the chips channeled by each flute by approximately 50%, the chips are more readily removed from the flutes, thereby ensuring that the opposed forces on the subject drill will remain balanced.

As explained above, both the primary and secondary cutting edges of the subject drill are perpendicular to the longitudinal axis of the drill. In most instances, the axial separation between the primary and secondary cutting edges will be very small. Therefore, the hole drilled by the subject drill will have a bottom surface that is substantially planar and perpendicular to the side walls of the hole. More specifically, the central portion of the bottom surface of the drilled hole will define a well that is separated from the outer portion of the bottom surface of the drilled hole by a distance equal to the axial separation between the primary and secondary cutting edges.

BRIEF DESCRIPTION OF THE DRAWINGS

FIG. 6 is a perspective view of a second embodiment of the subject flat bottom drill.

FIG. 7 is an end view of the flat bottom drill shown in FIG. 6.

FIG. 8 is a side elevational view of the flat bottom drill shown in FIG. 6 taken along the direction indicated by arrow 8 in FIG. 7.

FIG. 9 is a perspective view of a third embodiment of the subject flat bottom drill in which both the primary and secondary cutting edges are chamfered to increase the thickness of the central web.

FIG. 10 is an end view of the flat bottom drill shown in FIG. 9.

FIG. 11 is a side elevational view of the flat bottom drill shown in FIG. 9 taken along the direction indicated by arrow 11 in FIG. 10.

DETAILED DESCRIPTION OF THE PREFERRED EMBODIMENTS

Figure 1:
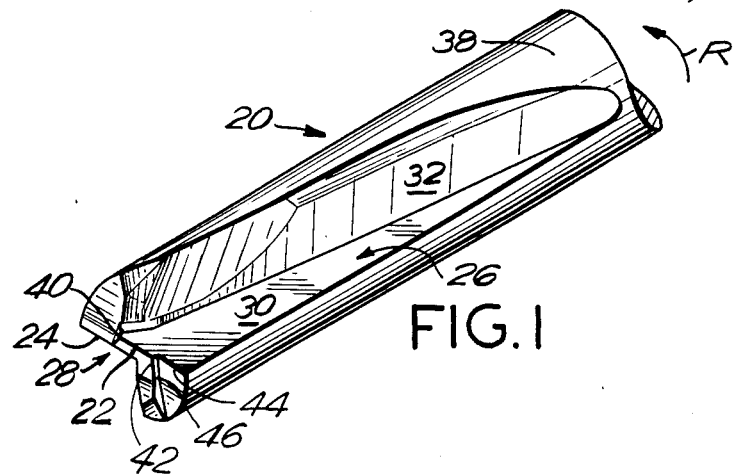
FIG. 1 is a perspective view of a preferred embodiment of a flat bottom drill of the subject invention.

The subject flat bottom drill, which is designated generally by the numeral 20 in FIG. 1, is a substantially cylindrical structure designed to rotate about its longitudinal axis. The flat bottom drill 20 is fabricated from a high strength material, preferably tungsten carbide for drilling on hard ferrous alloys. The drill can also be coated, for example with titanium nitride (TiN), titanium carbide (TiC), or aluminum oxide ($Al_2O_3$) to provide a very hard outer surface and improve tool life. For drilling on aluminum and aluminum alloys, it is further preferred to braze super-hard crystals (e.g., diamond) on both the primary and secondary cutting edges.

Figure 2:
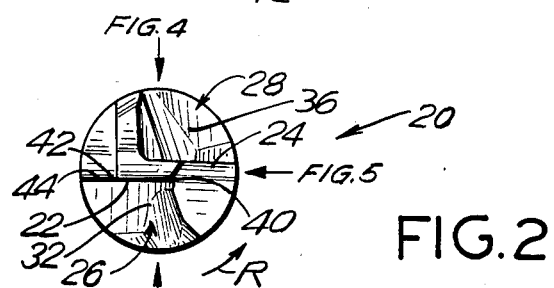
FIG. 2 is an end view of the preferred embodiment of the subject invention showing both the primary and secondary cutting edges.
Figure 3:
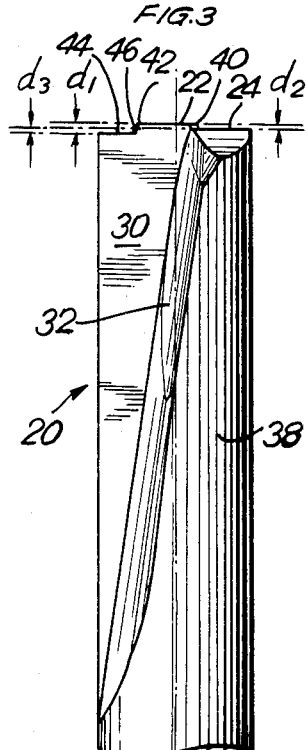
FIG. 3 is a side elevational view of the subject flat bottom drill taken along the direction indicated by arrow 3 in FIG. 2.

As shown in FIGS. 2 and 3, flat bottom drill 20 includes a primary cutting edge 22 and a secondary cutting edge 24. Primary flute 26 is defined by surfaces 30 and 32, which form a generally wedge-shaped section removed from flat bottom drill 20 and which extends away from primary cutting edge 22. Surface 30 of primary flute 26 is aligned substantially in a radial direction. Surface 32 of primary flute 26 extends in a non-axial direction so as to terminate at the peripheral surface 38 of flat bottom drill 20. Surfaces 30 and 32 of primary flute 26 intersect at an angle which preferably is in the range of 100° to 120°. In the preferred embodiment shown in FIGS. 1-5, this angle equals approximately 110°. By making the angle of intersection of surfaces 30 and 32 greater than a right angle, chips of stock material cut by primary cutting edge 22 are more reliably and efficiently removed through primary flute 26. Additionally, as shown most clearly in FIGS. 1 and 3, the portion of surface 32 in primary flute 26 nearest primary cutting edge 22 can be chamfered across the centerline of flat bottom drill 20 to further enhance the channeling of chips within primary flute 26. Primary flute 26 must be at least as long as the hole being drilled to ensure efficient, reliable chip removal.

Figure 4:
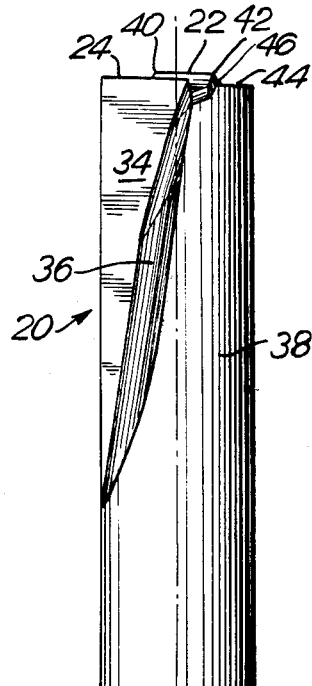
FIG. 4 is a side elevational view of the subject flat bottom drill taken along the direction indicated by arrow 4 in FIG. 2.

Turning to FIG. 4, secondary flute 28 is defined by surfaces 34 and 36. Surface 34 of secondary flute 28 is substantially parallel to surface 30 of primary flute 26. Surface 36 of secondary flute 28 extends in a non-axial direction so as to terminate at peripheral surface 38 of flat bottom drill 20. As with primary flute 26, surface 36 of secondary flute 28 intersects surface 34 thereof at an angle that preferably is in the range of 100° to 120°. Secondary flute 28 is at least as long as the hole being drilled to ensure proper chip removal, but need not be precisely the same length as primary flute 26.

As shown in FIGS. 1, 2 and 3, primary cutting edge 22 has an innermost end point 40 slightly to one side of the longitudinal axis of flat bottom drill 20. The outer primary cutting terminus 42 of primary cutting edge 22 is on the opposite side of the longitudinal axis of flat bottom drill 20 from innermost end point 40, and a distance approximately halfway between the axis and the periphery 38 of drill 20. As shown most clearly in FIG. 3, primary cutting edge 22 is substantialy perpendicular to the longitudinal axis, and defines the most extreme cutting end of flat bottom drill 20.

Adjacent to and radially aligned with primary cutting edge 22 is a non-cutting edge 44 which is separated in a longitudinal direction from primary cutting edge 22 by step 46. Non-cutting edge 44 extends from the periphery 38 of flat bottom drill 20 inwardly to step 46. The longitudinal separation between cutting edge 22 and non-cutting edge 44 is indicated by distance "$d_1$" in FIG. 3. As explained in greater detail below, non-cutting edge 44 performs no cutting function.

Secondary cutting edge 24 is substantially parallel to primary cutting edge 22 but is located on the opposite side of flat bottom drill 20. More specifically, secondary cutting edge 24 is perpendicular to the longitudinal axis of flat bottom drill 20 and extends inwardly from the periphery 38 a distance at least equal to the radial distance between the periphery 38 and the outer primary cutting terminus 42 of primary cutting edge 22.

Figure 5:
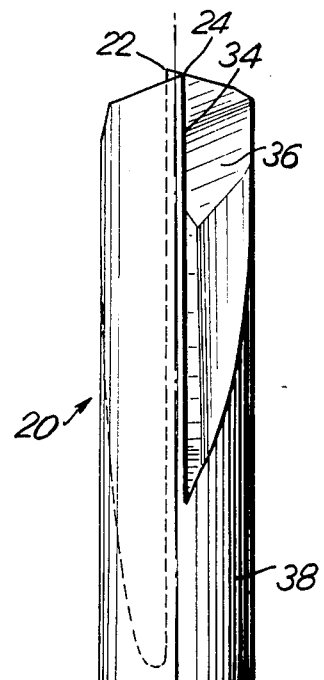
FIG. 5 is a side elevational view of the subject flat bottom drill taken along the direction indicated by arrow 5 in FIG. 2.

As shown most clearly in FIGS. 3, 4 and 5, secondary cutting edge 24 is offset from pimrary cutting edge 22 in a longitudinal direction by distance "$d_2$". The distance "$d_2$" is a function of both the design specifications of the desired hole to be drilled and the feed rate of drill 20. In many applications, the distance "$d_2$" can be as small as 0.003 to 0.004 inches. It is important to emphasize that the distance "$d_1$", which is the separation between non-cutting edge 44 and primary cutting edge 22 measured along the longitudinal axis, is greater than the distance "$d_2$" which is the separation between secondary cutting edge 24 and primary cutting edge 22, also measured along the longitudinal axis of drill 20. Additionally, distance "$d_3$", which is the separation between secondary cutting edge 24 and non-cutting edge 44 measured along the longitudinal axis of drill 20, is a function also of the feed rate of drill 20. More specifically, non-cutting edge 44 follows primary and secondary cutting edges 22 and 24 into an already drilled hole. By this unique arrangement, primary cutting edge 22 cuts the innermost portion of the hole to be drilled, secondary cutting edge 24 cuts the outermost portion of the hole to be drilled, and edge 44 performs no cutting function.

The precise dimensions of primary and secondary edges 22 and 24 and the separation "$d_2$" measured along the longitudinal axis will vary according to the specifications of the material to be drilled, and such dimensions will be selected to ensure that the forces on both the primary and secondary cutting edges will be substantially equal. Thus, the structure provides center cutting by primary cutting edge 22, and also provides balanced cutting by both primary cutting edge 22 and secondary cutting edge 24. In this manner, the subject flat bottom drill 20 provides the advantages of both the prior art gundrills and twist drills with the disadvantages of neither.

In operation, primary cutting edge 22 is the first portion of drill 20 to contact the workpiece. After this initial contact, the rotation of drill 20 about its longitudinal axis causes the portion of primary cutting edge 22 between the longitudinal axis and its outer primary cutting terminus 42 to begin cutting the center portion of the hole. Because the entire portion of primary cutting edge 22 from the centerline to outer primary cutting terminus 42 contributes to the cutting operation, the subject flat bottom drill 20 can be easily fed into the stock material without excessive axial force.

Secondary cutting edge 24 advances into the stock material after primary cutting edge 22 has drilled a hole to depth "$d_2$"(i.e., the separation between the primary and secondary cutting edges 22 and 24 measured along the longitudinal axis). After the secondary cutting edge 24 contacts the stock material, rotation of drill 20 causes secondary cutting edge 24 to drill the outermost portion of the hole. As mentioned above, distance "$d_2$" is a function of the feed rate and is selected to ensure that the secondary cutting edge will perform no cutting operation on the innermost part of the hole.

Chips removed from the stock material by the subject flat bottom drill 20 are such that each chip is approximately half as wide as chips produced by either gundrills or twist drills. More particularly, the chips of stock material produced by the primary cutting edge 22 will have a width substantially equal to the distance from the center line to outer primary cutting terminus 42 of primary cutting edge 22, which is approximately one half of the radius of flat bottom drill 20. Similarly, the chips of stock material produced by secondary cutting edge 24 will have a width equal to the difference between the radius of drill 20 and the width of chips produced by primary cutting edge 22. Against, these chips will be approximately equal to one half the radius of flat bottom drill 20. This cutting pattern differs significantly from the cutting patterns of both twist drills and gun drills, which produce chips having a width equal to the radius of the drill. By segmenting the chips into approximately equal inner and outer portions, the subject flat bottom drill 20 ensures that the chips can be efficiently and reliably removed through primary and secondary flutes 26 and 28. On the other hand, the chips produced by prior art twist drills or gundrills are wider than chips produced by the subject flat bottom drill 20, and they are therefore substantially more likely to jam in the flutes of those drills. Chip material that is retained, even temporarily, in the flutes of known drills can cause an imbalance of forces that could contribute to runout, thereby creating unacceptable tolerances for many design specifications. With the subject flat bottom drill 20, on the other hand, the chips are half as wide as the above mentioned prior art drills, and therefore are easily removed through flutes 26 and 28.

Turning to FIGS. 6, 7 and 8, an alternate embodiment of the subject flat bottom drill 20 is shown where the end most corner produced by surface 30 of primary flute 26 and the periphery 38 of the flat bottom drill 20 is chamfered to further ensure that the edge extending radially outward from primary cutting edge 22 will perform no cutting function. This chamfering produces triangular surface 48 which is angularly related to both the longitudinal axis of flat bottom drill 20 and the peripheral surface 38 thereof. The distance measured along the longitudinal axis of drill 20 between triangular surface 48 and primary cutting edge 22 is at all points greater than the distance between primary and secondary cutting edges 22 and 24, as measured along the longitudinal axis of drill 20. Furthermore, the offset between primary and secondary cutting edges 22 and 24 and triangular surface 48 is a function of the feed rate of flat bottom drill 20, so that secondary cutting edge 22 only cuts the outermost portion of the hole, and non-cutting edge 50 of triangular surface 48 performs no cutting function.

In many applications, the stock material with which the subject flat bottom drill 20 is used is extremely hard. To increase the strength and useful life of flat bottom drill 20 for these particularly demanding applications, surface 30 of primary flute 26 and surface 34 of secondary flute 28 may be offset away from each other and away from the longitudinal axis of drill 20, as shown in FIGS. 9 through 11. The primary and secondary cutting edges 22 and 24, however, remain in the relative positions described above by appropriate chamfering. More specifically, as shown most clearly in FIGS. 10 and 11, chamfered surface 52 extends angularly from surface 30 of primary flute 24 to primary cutting edge 22. Similarly, chamfered surface 54 extends angularly from surface 34 of secondary flute 28 to secondary cutting edge 24. This embodiment provides a stronger, wider web portion 56 as is apparent by comparing FIG. 2 to FIG. 10 or by comparing FIG. 5 to FIG. 11.

Additionally, as mentioned above, for extremely hard stock materials, super-hard crytals will preferably be included on both primary and secondary cutting edges 22 and 24. For example, in forming a drill suitable for boring into hard aluminum or aluminum alloy workpieces, commercially available inserts comprised of super-hard crystals (e.g., diamond, cubic boron nitride) embedded in tungsten carbide are cut and shaped to the proper demensions and then brazed to chamfered surfaces 52 and 54, providing super-hard crystal cutting edges. Ordinarily, the chamfered surfaces 52 and 54 of the cutting edges will be hollowed out slightly to provide a setting for the cutting inserts, so that the overall dimensions and geometry of the drill as pictured in the drawings will be the same.

Figure 12:
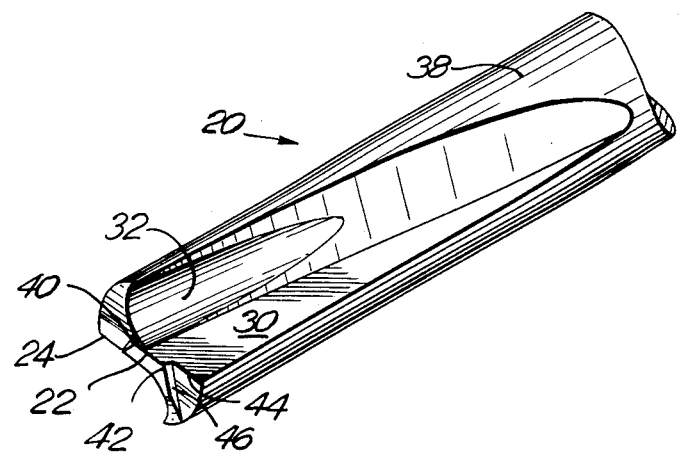
FIG. 12 is a perspective view of a fourth embodiment of the subject flat bottom drill in which a wall of the primary flute is concave to further facilitate chip removal.

In the embodiment of the subject invention shown in FIG. 12, surface 32 of primary flute 26 and surface 36 of secondary flute 28 are both provided with a concave configuration. Preferably, this particular shape is provided by a pressing operation during the fabrication of flat bottom drill 20. This concave configuration of surfaces 32 and 36 is desirable for work on certain metal stocks to provide a better movement of chips through the primary and secondary flutes 26 and 28.

Figure 13:
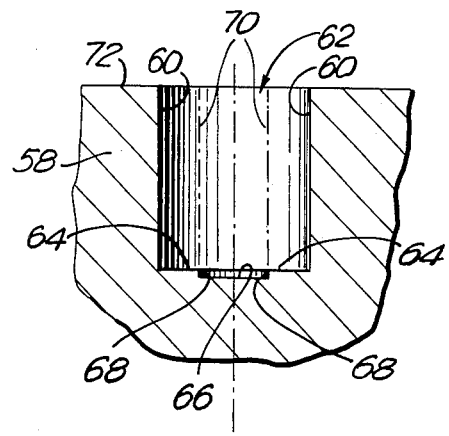
FIG. 13 is a cross-sectional view of a workpiece having a hole bored by the subject flat bottom drill.

FIG. 13 shows a typical hole drilled in a piece of stock 58 by the subject flat bottom drill 20. Stock material 58 is an extremely hard material, such as titanium or a very hard alloy steel. The cylindrical side wall 60 of hole 62 is drilled to an extremely tight tolerance by a single drilling operation with the subject flat bottom drill 20. For example, on a one half inch diameter hole 62, the side walls are provided with a tolerance of −0.0005 inches to +0.0015 inches in a single drilling operation. Hole 62 in stock material 58 is relatively shallow, such that side walls 60 may be no more than a quarter of an inch to approximately two inches in length.

The bottom of hole 62 is defined by annular shoulder 64 and circular central portion 66. The angle formed by the intersection of cylindrical side wall 60 and annular shoulder 64 is substantially equal to 90°. Central circular portion 66 is substantially parallel to annular shoulder 64, and therefore also is substantially perpendicular to cylindrical side walls 60. These perpendicular and parallel relationships result from the orthagonal alignment of primary and secondary cutting edges 22 and 24 to the centerline of flat bottom drill 20. The length of well wall 68 extending between annular shoulder 64 and circular bottom portion 66 equals distance "$d_2$", which, as explained above, is the separation between the primary and secondary cutting edges 22 and 24 measured along the longitudinal axis of the subject drill 20.

For very hard stock materials 58, such as hard steel AISI 4340, the feed rate of flat bottom drill 20 into stock 58 would be relatively low. Hence, the distance "$d_2$" separating the primary and secondary cutting edges 22 and 24 would be very small. For example, in many applications on very hard stock materials 58 the axial separation between the primary and secondary cutting edges 22 and 24 would be in the range of 0.003 inches to 0.004 inches. Therefore, well wall 68 also would be very small and the hole 62 in stock material 58 would have a nearly planar bottom surface.

During a drilling operation, the cylindrical portion between dashed lines 70 extending from the surface 72 of stock 58 to circular central portion 66 would be drilled entirely by primary cutting edge 22. The annular tubular section extending between dashed line 70 and cylindrical side wall 60 from surface 72 of stock 58 to annular shoulder 64 would be drilled entirely by secondary cutting edge 24.

The portions of stock material 58 that had extended between dashed lines 70 and cylindrical side wall 60 is cut entirely by secondary cutting edge 24 and is removed entirely through secondary flute 28. These chips of stock material 58 have a maximum width equal to the distance from dash lines 70 to cylindrical side wall 60. As explained above, this distance also is approximately one half the radius of flat bottom drill 20. The secondary flute 28, like the primary flute 26, has a maximum width at least equal to the radius of flat bottom drill 20. Therefore, the narrow chips produced by the secondary cutting edge 24 are efficiently and reliably removed through secondary flute 28.

Again referring to FIG. 13, the portion of hole 62 between dashed line 70 would be drilled entirely by primary cutting edge 22. Because primary cutting edge 22 extends across the longitudinal axis of flat bottom drill 20, the drilling of stock material 58 would commence immediately upon contact of primary cutting edge 22 with stock material 58. Thus, unlike twist drills, it would be unnecessary to exert a substantial axial force to effect the drilling action. All of the stock material 58 that had been between dashed lines 70 would have been removed through primary flute 26. The width of this material would be equal to the distance from centerline of the drilled hole to dashed lines 70. As explained above, this distance typically is equal to one half of the radius. Because the primary flute 26 extends the full distance from the centerline to the periphery 38 of flat bottom drill 20, these narrow chips are efficiently and reliably removed through primary flute 26. To further encourage the egress of chips, the entire drill can be coated with TiN.

In summary, a flat bottom drill is provided that has opposed primary and secondary cutting edges. The primary cutting edge extends across and is perpendicular to the longitudinal axis of the flat bottom drill. The secondary cutting edge faces the opposite direction and is disposed on the opposite side of the subject flat bottom drill. Additionally, the secondary cutting edge is substantially perpendicular to the longitudinal axis of the subject drill and extends inwardly from the perimeter thereof a distrance at least equal to the difference between the radius of the drill and the length of the primary cutting edge. The secondary cutting edge is offset from the primary cutting edge axially a distance which is a function of the feed rate of the drill. The relative sizes of the primary and secondary cutting edges are selected to assure substantial balancing of forces about the longitudinal axis of the subject flat bottom drill. During a drilling operation, the primary cutting edge contacts the stock material initially and cuts the centermost portion of the hole in the stock material. Typically, the radius of this centermost portion will equal approximately half the entire radius of the hole. The secondary cutting edge follows the primary cutting edge and drills the outermost portion of the hole. Each cutting edge produces chips of stock material having a width approximately equal to one half the radius of the subject drill. The chips produced by the primary cutting edge are efficiently and reliably removed through the primary flute. The chips produced by the secondary edge similarly are efficiently and reliably removed through the secondary flute. By producing narrow chips that are segmented to opposite flutes, the chips move freely, thereby precluding any chance that the chips could contribute to an imbalance of forces about the centerline of the subject flat bottom drill. This structure assures that very precise holes can be drilled in a very hard material by a single drilling operation without the use of excess equipment such as guide bushings.

While the preferred embodiment of the subject invention has been described and illustrated, it is obvious that various changes and modifications can be made therein without departing from the spirit of the present invention; and all such obvious changes and variations are included in the scope of the invention as defined by the appended claims.

We claim:

1. A flat bottom hole drill having a substantially cylindrical side surface and opposed mounting and cutting ends, said drill comprising:

a primary cutting edge at the cutting end of said drill, said primary cutting edge extending radially and perpendicularly across the longitudinal axis of said drill to an outer primary cutting terminus disposed intermediate said longitudinal axis and the cylindrical side surface of said drill;

a secondary cutting edge disposed at the cutting end of said drill and substantially diametrically opposed to said primary cutting edge, said secondary cutting edge extending radially inwardly from said cylindrical side surface generally parallel to the primary cutting edge for a distance at least equal to the radial distance from said cylindrical side surface to said outer primary cutting terminus, said secondary cutting edge being offset from said primary cutting edge along the longitudinal axis of said drill and away from said cutting end of said drill by a distance selected to ensure that the forces on both the primary and secondary cutting edges will be substantially equal; and primary and secondary flutes extending toward the mounting end of said drill and away from said primary and secondary cutting edges respectively, said primary flute being defined by a first primary planar surface disposed parallel to said primary cutting edge and said longitudinal axis of said drill and a second primary flute surface angularly disposed with respect to both said primary cutting edge and said longitudinal axis of said drill, said secondary flute being defined by a first secondary flute planar surface disposed parallel to both said secondary cutting edge and said longitudinal axis of said drill and a second secondary flute surface angularly disposed with respect to both said secondary cutting edge and said longitudinal axis of said drill, and primary and secondary flute angles being defined by the intersections of said first and second primary flute surfaces and said first and second secondary flute surfaces repectively, and said primary and secondary flute angles each being greater than 90°, whereby said primary cutting edge drills the radially innermost portion of a hole and the secondary cutting edge drills the radially outermost portion of the hole, and chips of material cut by the primary cutting edge are channeled through the primary flute and chips of material cut by the secondary cutting edge are channeled through the secondary flute.

2. A drill as in claim 1 wherein the radial distance from the longitudinal axis of said drill to the outer primary cutting terminus substantially equals one half the radius of said drill.

3. A drill as in claim 1 further comprising a non-cutting edge disposed at the cutting end of said drill and extending radially inwardly from the cylindrical side surface toward the longitudinal axis, said non-cutting edge and said primary cutting edge being disposed in a common radially extending plane, the distance from said primary cutting edge to said non-cutting edge measured parallel to the longitudinal axis of said drill being greater than the distance from said primary cutting edge to said secondary cutting edge measured parallel to the longitudinal axis.

4. A drill as in claim 1 wherein said primary and secondary flute angles are each in the range of 100° to 120°.

5. A drill as in claim 1 wherein the intersection of said first primary flute surface and said cylindrical side surface at the cutting end of said drill defines a non-cutting corner, and wherein said non-cutting corner is chamfered to define a substantially wedge shaped non-cutting surface of said drill.

6. A drill as in claim 1 wherein said primary and secondary cutting edges are chamfered to intersect the first primary flute surface and first secondary flute surface respectively.

7. A drill as in claim 1 wherein said second primary flute surface and second secondary flute surface are concave to facilitate egress of material cut by said primary and secondary cutting edges.

8. A drill as in claim 1, at least a portion of which is coated with titanium nitride, aluminum oxide, or titanium carbide.

9. A drill as in claim 1 wherein said drill is contructed from a unitary member of tungsten carbide.

10. A drill as in claim 7 wherein said primary and secondary cutting edges are provided with super-hard crystals comprising diamond or cubic boron nitride brazed to said cutting edges.

* * * * *